Figure 1:
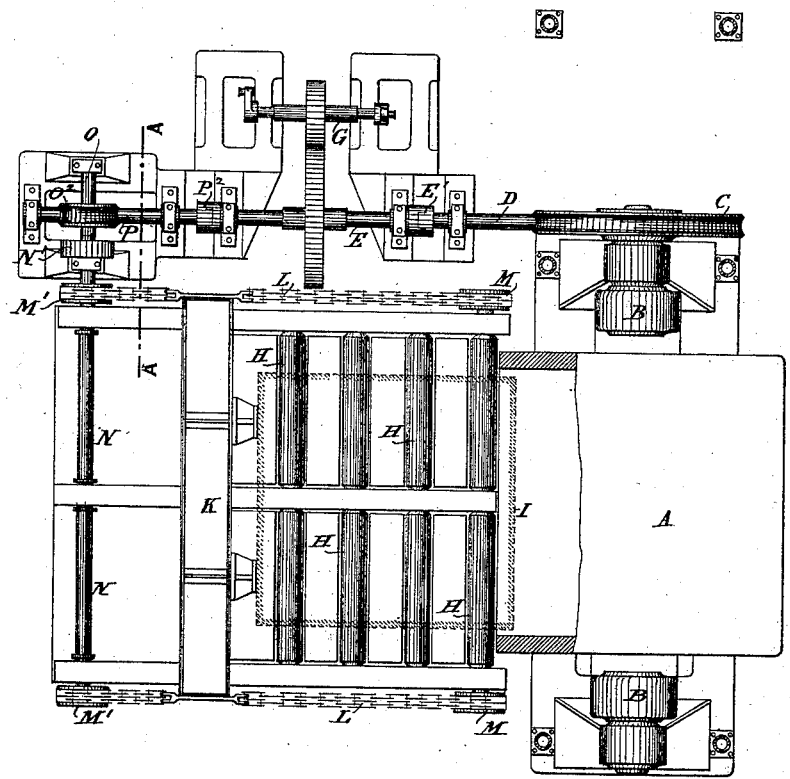

(No Model.) 5 Sheets—Sheet 1.

A. WILSON.
APPARATUS FOR MANUFACTURING COMPOUND PLATES OF IRON AND STEEL.

No. 380,970. Patented Apr. 10, 1888.

Witnesses: Baltus D. Long, Lloyd B. Wright

Inventor: A. Wilson
By attys. Baldwin, Hopkins & Peyton

N. PETERS, Photo-Lithographer, Washington, D. C.

(No Model.) 5 Sheets—Sheet 2.
A. WILSON.
APPARATUS FOR MANUFACTURING COMPOUND PLATES OF IRON AND STEEL.
No. 380,970. Patented Apr. 10, 1888.
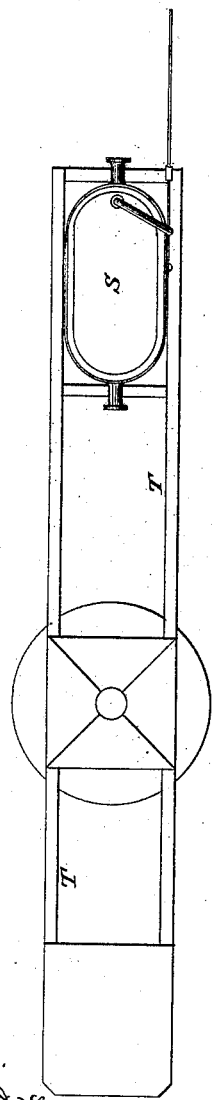
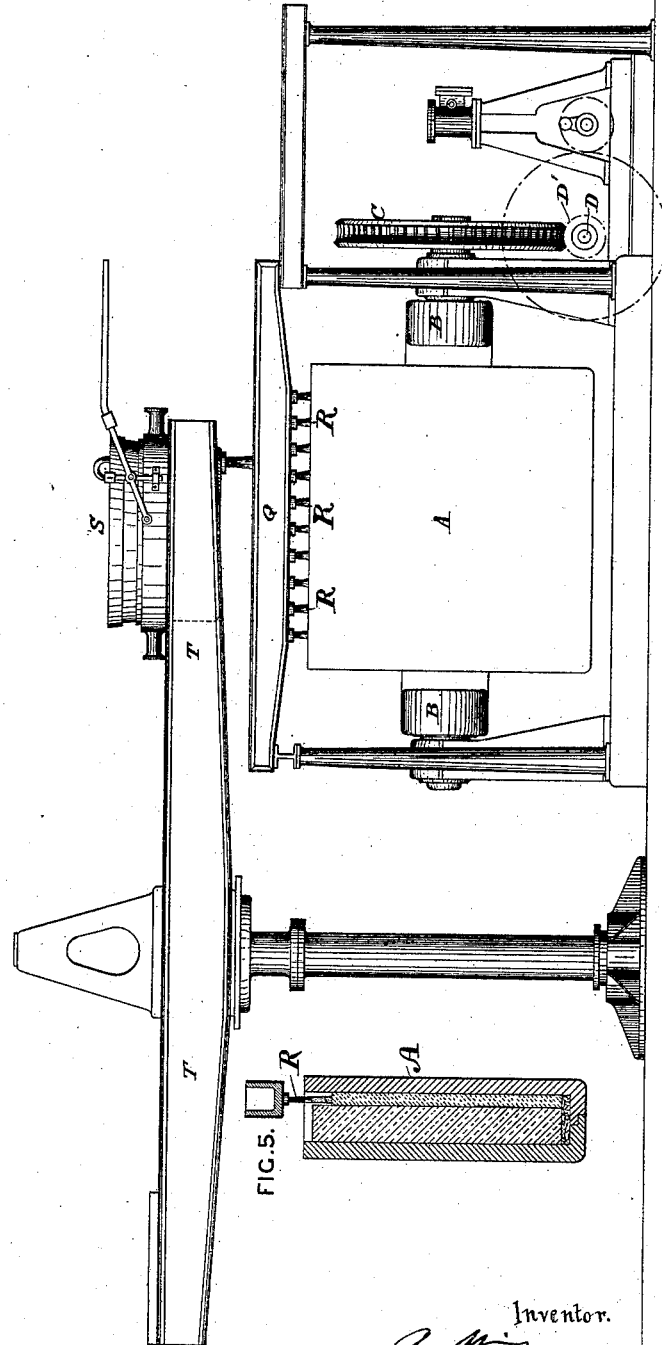

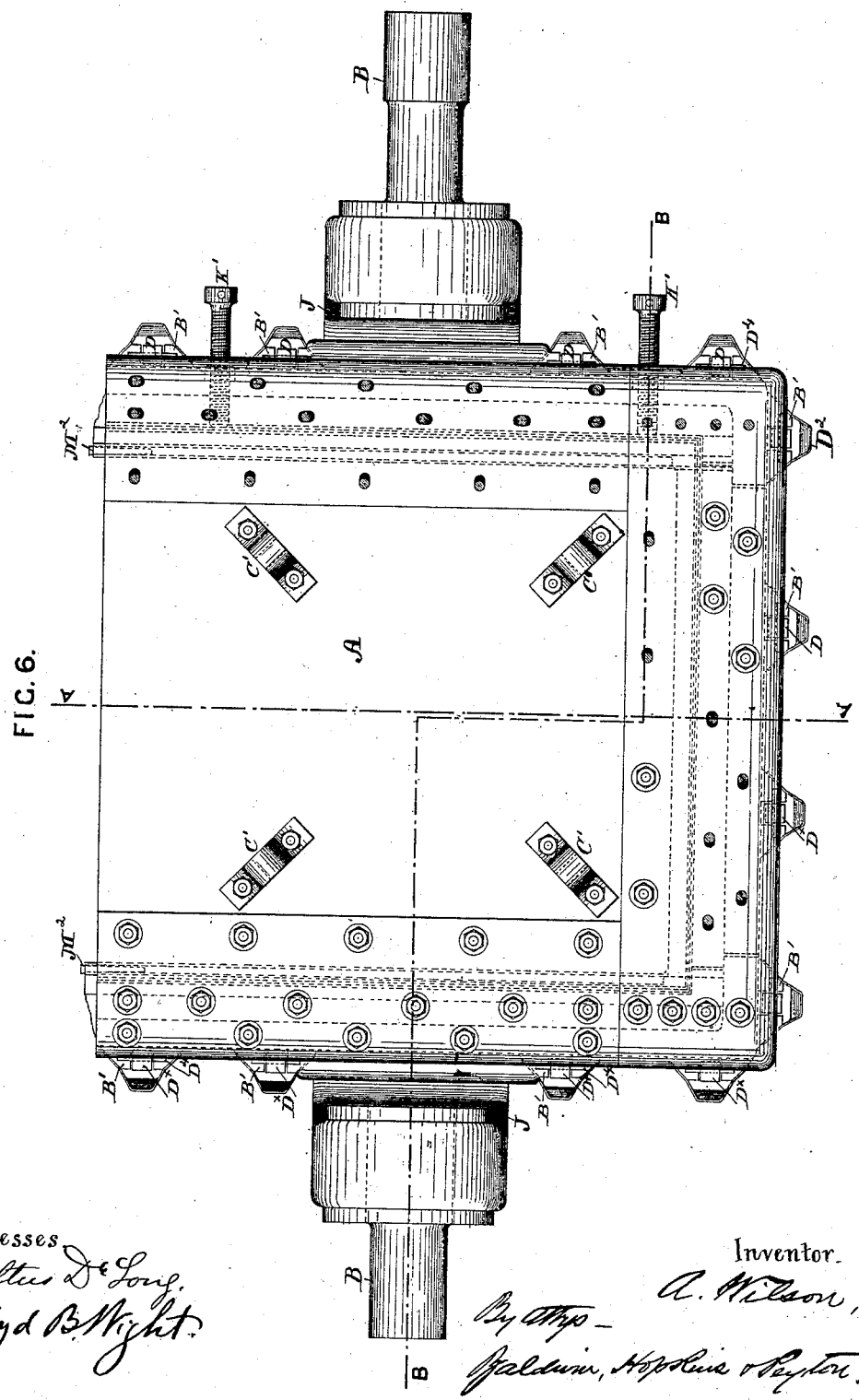

(No Model.) 5 Sheets—Sheet 4.
A. WILSON.
APPARATUS FOR MANUFACTURING COMPOUND PLATES OF IRON AND STEEL.
No. 380,970. Patented Apr. 10, 1888.
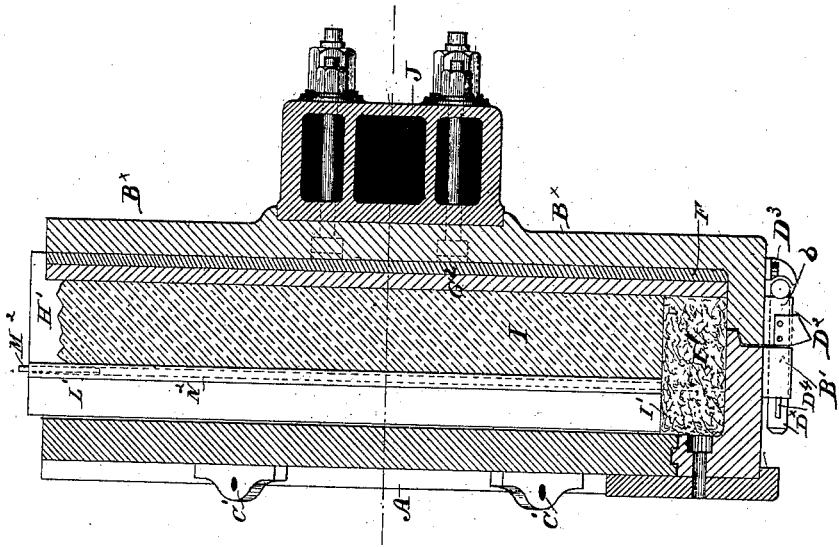
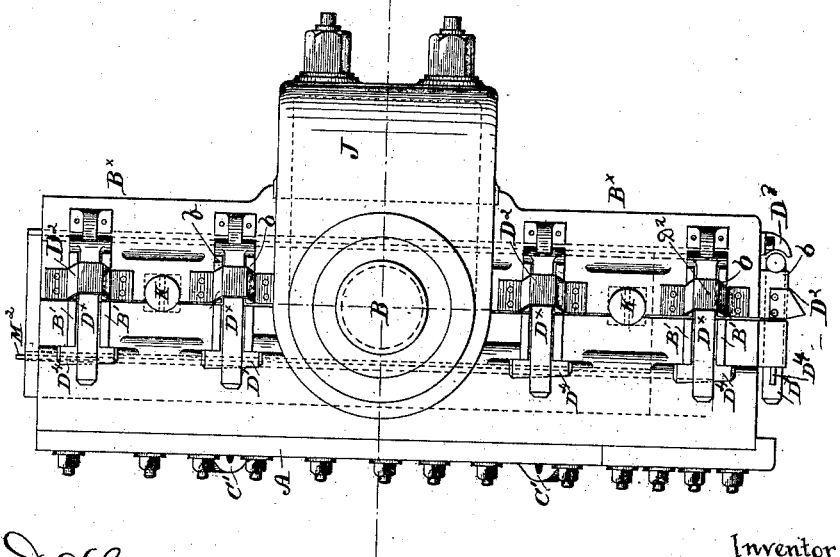
Witnesses.
Inventor.

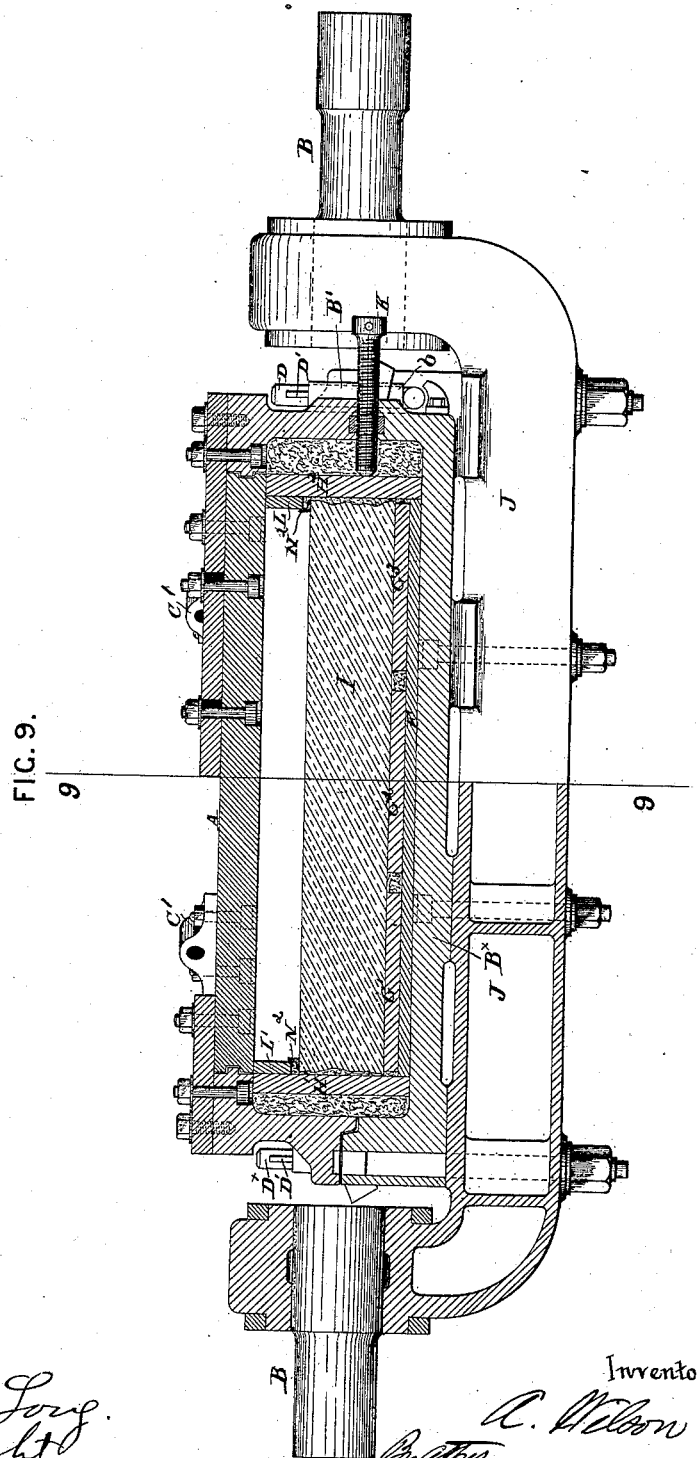

UNITED STATES PATENT OFFICE.

ALEXANDER WILSON, OF SHEFFIELD, COUNTY OF YORK, ENGLAND.

APPARATUS FOR MANUFACTURING COMPOUND PLATES OF IRON AND STEEL.

SPECIFICATION forming part of Letters Patent No. 380,970, dated April 10, 1888.

Application filed May 17, 1887. Serial No. 238,494. (No model.)

*To all whom it may concern:*

Be it known that I, ALEXANDER WILSON, a subject of the Queen of Great Britain, residing at Sheffield, in the county of York, England, steel-manufacturer, have invented certain new and useful Improvements in Apparatus for Manufacturing Compound Plates of Iron and Steel, of which the following is a specification.

In a previous application for patent made by me on the 9th day of April, 1887, No. 234,258, I described an improved method and apparatus for casting a face of steel onto a backing-plate of wrought-iron. In that method the plate was taken hot as it came from rolls or forging machinery and placed onto a flat table, off which it was pushed into a mold which was brought into a horizontal position to receive it. The mold was then turned on trunnions to bring it into a vertical position and molten steel was poured into the mold.

My present invention has for its object to improve the machinery used for casting a facing of steel onto a wrought-iron backing-plate in this manner, or for casting on both a facing of steel and also a back of soft ingot-iron, as described in another application for patent made by me on the 9th day of April, 1887, No. 234,260.

I now cause the wrought-iron plate, as it comes hot from the forging mechanism, to be placed onto a bed composed of parallel rollers. By means of a bar secured at its ends to two endless chains—one chain on one side of the series of rollers and the other chain on the opposite side—I push the plate over the rollers and into the mold, which, as before, is mounted on trunnions. On one trunnion is a worm-wheel, into which is made to gear a worm fixed on a shaft, which by a clutch can be clutched to a driving-shaft in line with it, and this driving-shaft, by another clutch, can also be clutched to another shaft, from which, by worm and worm-wheel gear, motion is transmitted to the endless chains. When the mold is turned into a vertical position, its open top comes below a distributing-trough, in the bottom of which are a number of holes at distances apart along the bottom, so that molten metal is simultaneously supplied into the mold along the whole of the length. The metal is supplied to the trough from a ladle carried by a horizontal crane-arm, which can be swung around a vertical standard which approximately is in a line with the axes or trunnions on which the mold turns, so that the ladles may ultimately be brought into a position in which they are filled with molten metal, and then brought over the molds so as to discharge the molten metal into them. To facilitate the opening and closing of the mold, I form it into two halves held together by hinged cotter-bolts and cotters. One-half of the mold I secure by bolts to a bar or frame, at the ends of which are the trunnions on which the mold is to turn, so that the mold can readily be detached from the trunnioned frame and a fresh one put in its place.

Figure 4:
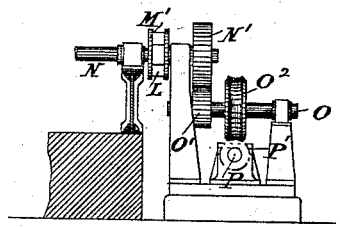
Figure 2:
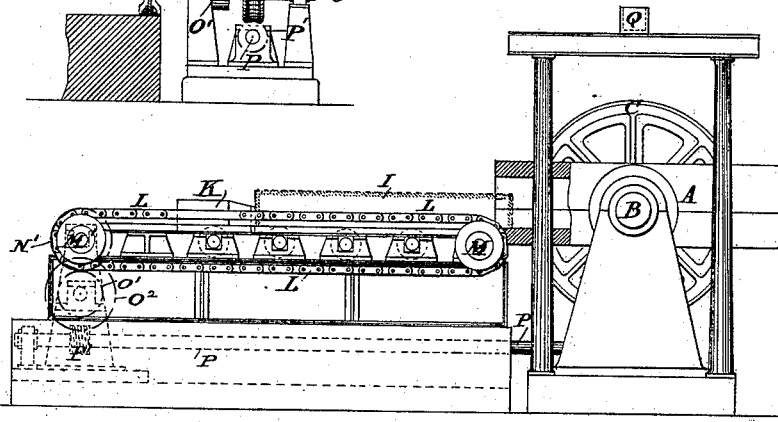

In the accompanying drawings, Figure 1 is a plan, and Fig. 2 a side elevation, and Fig. 3 an end elevation, of the apparatus. Fig. 3* is a plan of a portion of the same. Fig. 4 is a section through the line A A, Fig. 1. Fig. 5 is a cross-section of a mold with a heated wrought-iron plate within it, onto which molten metal is cast. Fig. 6 is a plan, and Fig. 7 an elevation, of the mold to a larger scale. Fig. 8 is a section on the line A A of Fig. 6, and Fig. 9 a section on the line B B of Fig. 6.

In Figs. 1 to 5, A is the mold, supported on trunnions B. C is a worm-wheel on the end of one of the trunnions. This worm-wheel has gearing into it a worm, D', fixed on a shaft, D. The axis is in a line with a second shaft, E, and can be clutched to it by a clutch, E'. The shaft E is driven by spur-gearing from the crank-shaft G of a small steam-engine, which can be started whenever required.

H is a series of horizontal parallel rollers, forming a table in front of the open mouth of the mold when the mold is turned into a horizontal position, as shown at Fig. 1.

I is a wrought-iron "backing" or "intermediate" plate which has been brought while hot from the rolling or forging mill by an overhead crane and laid onto the rollers H.

K is a horizontal girder resting on the supports which carry the rollers H. At its ends it is secured to endless chains L, which pass around and gear with chain-wheels M M'. The chain-wheels M are on the axis of the roller nearest to the mold, and the chain-wheels M' on a shaft, N, which at one end has on it a toothed wheel, N'. This is driven by a pinion, O', on an intermediate shaft, O. The shaft O is itself driven by a worm-wheel, O², fast upon it, into which gears a worm, P', fixed on a shaft, P, which shaft is in a line with and can be clutched to the driving-shaft E by a clutch, $P^2$, whenever the chain wheels are required to be driven.

Q is a trough or spout, below which the open mouth of the mold is brought when the mold is turned into an approximately vertical position. Through the bottom of the trough are a number of openings, through which a number of streams, R, of metal can be run into the mold. Preferably as they pass into the mold they are made to run down the face of the plate, and thereby impart heat to it. The mold for this purpose is slightly inclined from the vertical.

S is a ladle carried on a swinging crane-arm, T, and from which molten metal can be run into the trough or spout Q.

When the mold A has been brought into a horizontal position, as shown at Fig. 1, and the plate I has been placed onto the rollers, the girder K is by the endless chains brought against the back end of the plate and presses the plate forward into the mold. The driving-shaft E is then unclutched from the shaft P and clutched to the shaft D to turn the mold into a nearly vertical position. The molten metal is then run into the mold, and when it has sufficiently set the mold is again turned into a horizontal position. The side of the mold which is uppermost is then detached from the lower side and taken away. The plate is slid forward onto the rollers H and taken off by a crane to a reheating-furnace, where it may be reheated prior to being again forged or rolled.

To facilitate the opening and closing of the mold, the mold is, as shown at Figs. 6 to 9, formed in two parts, which in these figures are marked A $B^\times$. Preferably the lower half, $B^\times$, is entirely of cast-iron, and the upper half, A, partly of a rectangular cast-iron rim and a wrought-iron top plate secured to it by bolts. To the wrought-iron top plate are bolted four eyes, C', by which the upper half can be lifted away when it is detached from the lower half. When the mold is closed, the parts A and $B^\times$ are held together by swinging cotter-bolts $D^\times$, which at one end are hinged to the part $B^\times$, while their other ends pass between lugs B' on the part A and have cotters or wedges $D^4$ driven through slots formed in them.

$D^2$ $D^2$ are guideway-stops, formed of thin bent strips of sheet-iron fixed to the lower part of the mold. They limit the outward or swinging movement of the bolts $D^\times$, allowing them to swing out from between the lugs B' B', but preventing further outward movement.

$D^3$ $D^3$ are hook-like parts of the joints by which the pintles of the bolts $D^\times$ have loose-jointed connection with the lower part of the mold, which part is provided with stop-lugs b b, limiting the movement of the cotter-bolts away from the joint-hooks $D^3$.

The lower half of the mold is, as shown, secured by bolts to a strong bar or rocking frame, J, at the ends of which are the trunnions B, on which the mold is to turn. In this way the lower half of the mold can, when worn, be quickly removed and a fresh mold-section substituted for it.

To prepare the mold for receiving a hot backing or intermediate plate, a layer, F, of fire-brick or ganister, is first spread over the bottom of the part $B^\times$, and onto this are laid false bottom plates, G' $G^2$ $G^3$, of wrought-iron, so as to protect the bottom of the mold from the heat of the plate. The edges or sides of the mold are also protected by loose plates H' $H^2$, of wrought-iron, and the end which is lowermost when the mold is vertical is protected by a block, I', of fire-brick or ganister, as shown at Fig. 8.

When the mold has been closed and the hot wrought-iron plate I pushed into it, the loose plate $H^2$ is, by screws K', forced against one edge of the plate, thereby forcing the opposite edge of the plate against the loose plate H'. Filling-pieces L', of wrought-iron, are also inserted along the edges of the hot backing-plate between it and the wrought-iron plate which forms the top of the part A, to prevent the hot backing-plate from falling away from the false bottom plates, G' $G^2$ $G^3$, when the mold is turned into a vertical position. The filling-pieces are retained by wedges $M^2$, driven between them and bars of angle-iron $N^2$, which bear against the backing-plate.

The exposed portion of the top plate of the part A, being made of wrought-iron, does not require to be protected, except by a very thin layer of paste made of fire-clay and graphite, to prevent the molten metal adhering to it.

Having now particularly described and ascertained the nature of my said invention and in what manner the same is to be performed, I declare that what I claim is—

1. The combination of the rocking mold, its trunnions, the worm-wheel on one of the trunnions, the worm gearing with the worm-wheel, the worm-shaft, the driving-shaft having clutch-connection at one end with the worm-shaft, the shaft P, with which the opposite end of the driving-shaft has clutch-connection, the intermediate shaft actuated by the shaft P, the driven shaft actuated by the intermediate shaft, the series of rollers, the girder, and the endless chains actuated by said driven shaft and operating the girder, substantially as and for the purpose set forth.

2. The combination of the trunnioned frame, the lower part of the mold detachably secured to said frame, the upper part of the mold, the cotter-bolts having loose-jointed connection with the lower part of the mold, the lugs on the upper part of the mold, the stop-lugs on the lower part of the mold, the guideway-stops, and the cotter-wedges, substantially as and for the purpose set forth.

ALEXANDER WILSON.

Witnesses:
BENJN. BURDEKIN,
*Solicitor and Notary Public, Sheffield.*
C. B. HOBBIS,
*His Clerk.*